No. 761,926. Patented June 7, 1904.

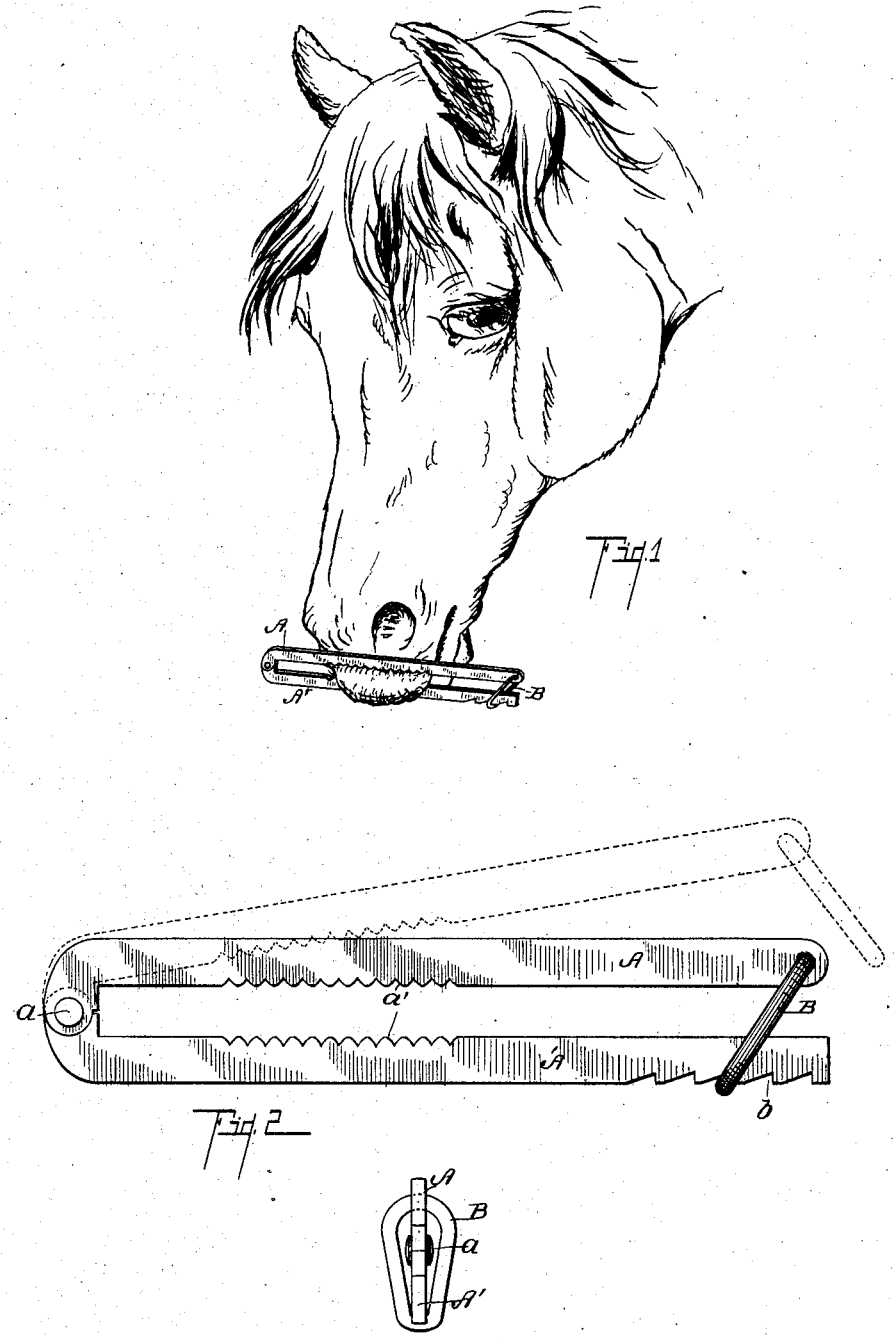

UNITED STATES PATENT OFFICE.

ARNOLD W. VAN LOGHEM, OF KALAMAZOO, MICHIGAN.

SUBDUING DEVICE FOR ANIMALS.

SPECIFICATION forming part of Letters Patent No. 761,926, dated June 7, 1904.

Application filed July 15, 1903. Serial No. 165,549. (No model.)

*To all whom it may concern:*

Be it known that I, ARNOLD W. VAN LOGHEM, a citizen of the United States, residing at the city of Kalamazoo, in the county of Kalamazoo and State of Michigan, have invented certain new and useful Improvements in Subduing Devices for Animals, of which the following is a specification.

This invention relates to improvements in devices for subduing horses.

Heretofore it has been the practice to employ what is known as "twitches" to subdue vicious horses or horses which it is desirous to work about or operate upon, as in shoeing, clipping, and the like. It consists of a loop of rope which is placed upon the upper lip of the animal and twisted tight by the means of a stick, the manipulator always retaining his hold upon the stick. This causes the animal great suffering and usually does not accomplish the results intended, as the animal submits but for a short time and will then struggle to free itself.

The object of my invention is to provide a device for use in subduing vicious horses or horses which it is desired to handle or work upon which will cause the animal to stand quiet or subdue it so that it will submit to being handled without injury to the animal or inflicting suffering thereon.

Further objects and objects relating structural details will definitely appear from the detailed description to follow.

I accomplish the objects of my invention by the devices and means described in the following specification.

The invention is clearly defined, and pointed out in the claims.

A structure embodying the features of my invention is fully illustrated in the accompanying drawings, forming a part of this specification, in which—

Figure 1 is a perspective view of the head of a horse with my improved subduing or training device in position thereon. Fig. 2 is a perspective view of my improved subduing or training device. Fig. 3 is an end elevation view looking from the right of Fig. 2.

In the drawings similar letters of reference refer to similar parts throughout the several views.

Referring to the lettered parts of the drawings, the clamp bars or jaws A A' are offset at one end and pivotally secured together by a suitable pin $a$. The inner edges of these clamp-bars A A' are provided with blunt serrations or teeth $a'$. The clamp-bars are adjustably retained in their closed position by a loop B on the free end of the bar A, which is adapted to be passed over the end of the bar A' and engage the teeth $b$ thereon. Thus arranged the bars are securely retained in position. The bars A A' are preferably of metal or of some material having considerable weight.

In operation the bars are clamped upon the upper lip of the animal, as is illustrated in Fig. 1. These bars are only tightened sufficiently to retain them in position on the lip.

With my device in position the animal soon becomes quiet and stands quietly or may be led easily and quietly about. The device does not cause the animal any considerable annoyance, the animal merely drooping its head slightly and extending the nose somewhat forwardly. The flesh is not abraded or otherwise injured in any manner.

As before remarked, by the use of my subduing device the animal remains perfectly quiet, and it is entirely safe to handle, as is required in clipping or shoeing or similar operations or in loading upon vessels, cars, or the like, which heretofore has been very difficult to accomplish without serious injury or suffering to the animal and danger to the workmen. Vicious animals also are quickly subdued and will not bite, strike, or kick while my device is in position.

I have illustrated and described my improved subduing device in the form preferred by me on account of its economy of manufacture and the ease with which it may be applied or removed. I am aware, however, that it is capable of very great structural variation without departing from my invention.

Having thus described my invention, what I claim as new, and desire to secure by Letters Patent, is—

1. In a device for subduing or training animals, the combination of a pair of bars A A' having offset portions at one end pivotally secured together at $a$, having serrations $a'$ on their inner edges; a loop B on the said bar A, and a series of teeth $b$ on the said bar A' adapted to engage the said loop, for the purpose specified.

2. In a device for subduing or training animals, the combination of a pair of clamping-bars having offset portions at one end pivotally secured together, adapted to embrace the upper lip of an animal; and means for adjustably securing the free ends of said bars together.

3. In a device for subduing or training animals, the combination of a pair of bars A A' having serrations $a'$ on their inner edges, pivotally secured together at $a$; a loop B on the said bar A; and a series of teeth $b$ on said bar A' adapted to engage said loop, for the purpose specified.

4. In a device for subduing or training animals, the combination of a pair of clamping-bars pivotally secured together at one end, adapted to embrace the upper lip of an animal; and means for adjustably securing the free ends of said bars together.

5. In a device for breaking or training animals or the like, the combination of a pair of bars having serrations on their inner edges, adapted to embrace the upper lip of an animal; and means for detachably securing the said bars together.

6. In a device for subduing or training animals, the combination of a clamp adapted to embrace the upper lip of an animal; and means for detachably securing said clamp in position.

In witness whereof I have hereunto set my hand and seal in the presence of two witnesses.

ARNOLD W. VAN LOGHEM. [L. S.]

Witnesses:
 ETHEL TELLER,
 OTIS A. EARL.